United States Patent [19]

Van Dasler et al.

[11] Patent Number: 5,319,676
[45] Date of Patent: Jun. 7, 1994

[54] DIGITAL PRE-MODULATION FILTER

[75] Inventors: Gerrit Van Dasler; Hendrikus L. Verstappen, both of Huizen, Netherlands

[73] Assignee: U.S. Philips Corporation, New York, N.Y.

[21] Appl. No.: 289,284

[22] Filed: Dec. 21, 1988

[30] Foreign Application Priority Data

Dec. 21, 1987 [NL] Netherlands .................. 8703084

[51] Int. Cl.$^5$ ............................................ H04L 25/03
[52] U.S. Cl. .................................. 375/60; 364/724.18; 324/76.11
[58] Field of Search ................. 375/60, 58, 18; 332/107, 109; 364/724.18; 455/50; 324/77 B, 77 D

[56] References Cited

U.S. PATENT DOCUMENTS

| | | | |
|---|---|---|---|
| 4,141,072 | 2/1979 | Perreault | 375/12 X |
| 4,229,821 | 10/1980 | de Jager et al. | 375/53 |
| 4,261,053 | 4/1981 | Dostis et al. | 375/60 |
| 4,477,916 | 10/1984 | Chung | 375/60 |
| 4,531,221 | 7/1985 | Chung et al. | 375/60 |
| 4,731,800 | 3/1988 | Motley et al. | 375/60 X |
| 4,757,519 | 7/1988 | Collison et al. | 375/60 |

OTHER PUBLICATIONS

F. de Jager et al., "Tamed Frequency Modulation, a Novel . . . ", IEEE Trans. Comm., vol. Com-26, No. 5(5/78) pp. 534-542.

P. Kabal et al., "Partial-Response Signalling", IEEE Trans. Comm., vol. Com-23, No. 9 (9/75) pp. 921-934.
D. Muilwijk, "Correlative Phase Shift Keying—A Class of Constant . . . ", IEEE Trans. Comm., vol. Com 29, No. 3 (3/81) pp. 226-236.

*Primary Examiner*—Stephen Chin
*Assistant Examiner*—Tesfaldet Bocure
*Attorney, Agent, or Firm*—Anne E. Barschall

[57] ABSTRACT

A digital pre-modulation filter with a finite impulse response having the value $k(t)=h(t)\cdot w(t)$, where $h(t)$ represents an impulse response of the type that is customary for a modulator, for generating in response to data signals an angle-modulated carrier signal having a substantially constant amplitude, and $w(t)$ represents a window function by which the impulse response of the pre-modulation filter is truncated softly. It turns out to be possible to reduce the disturbing effects with respect to the power spectrum caused by such a soft truncation and cancel them with respect to the phase of the angle-modulated carrier signal. Thereto, according to the invention the impulse response $k(t)=A\{g(t)+x(t)\}\cdot w(t)$ is selected where A is a correction factor which is usually equal to one, $g(t)$ is the untruncated impulse response of the filter, $x(t)$ is a constant $c_c$ or a time-dependent correction function which in a preferred embodiment has such a variation that for example $$\int_{(r-1/2)T}^{(r+1/2)T} k(t)dt = 0 \quad \text{if} \quad \int_{(r-1/2)T}^{(r+1/2)T} A\cdot g(t)dt = 0$$

for any integer value of i.

4 Claims, 8 Drawing Sheets

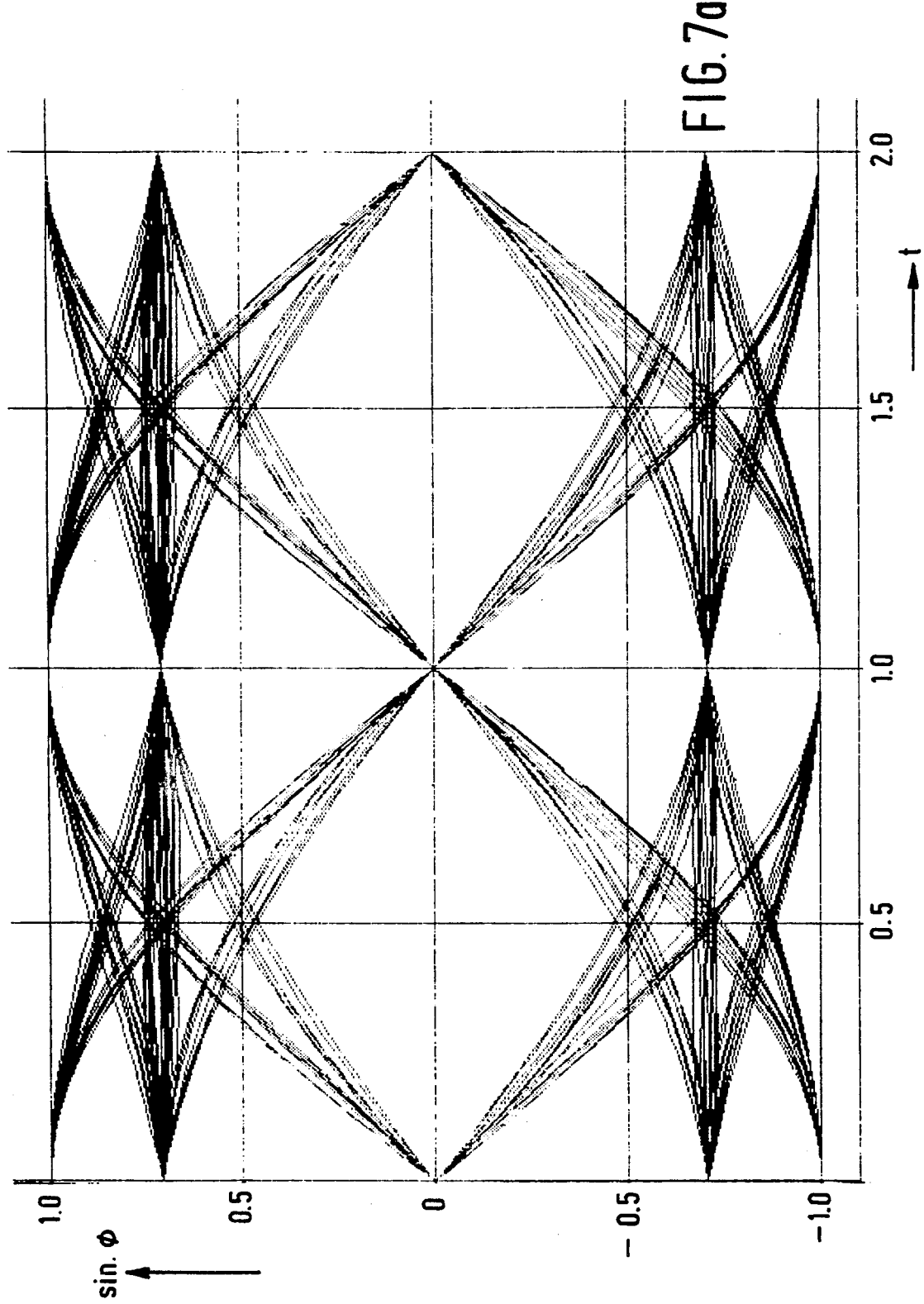

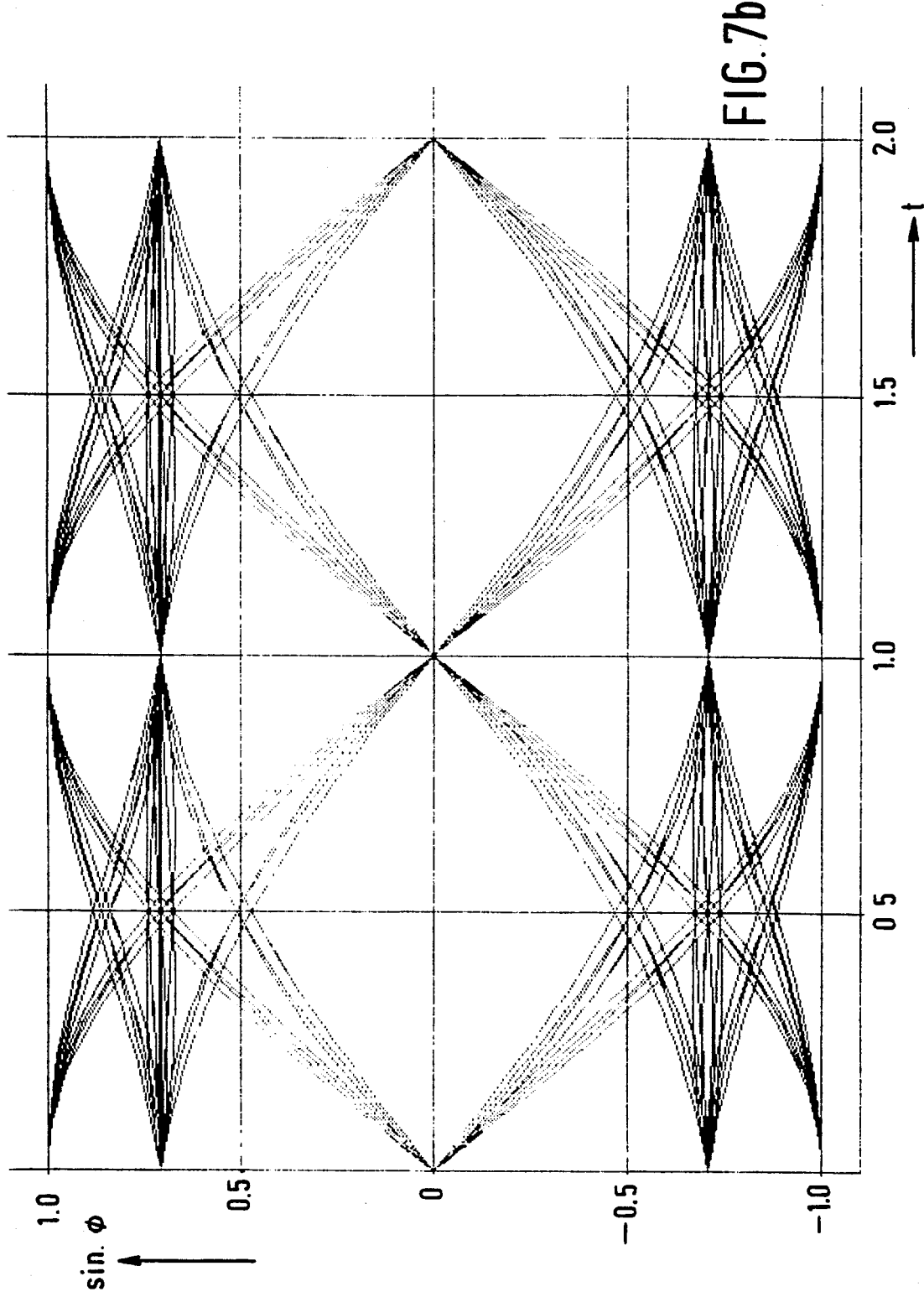

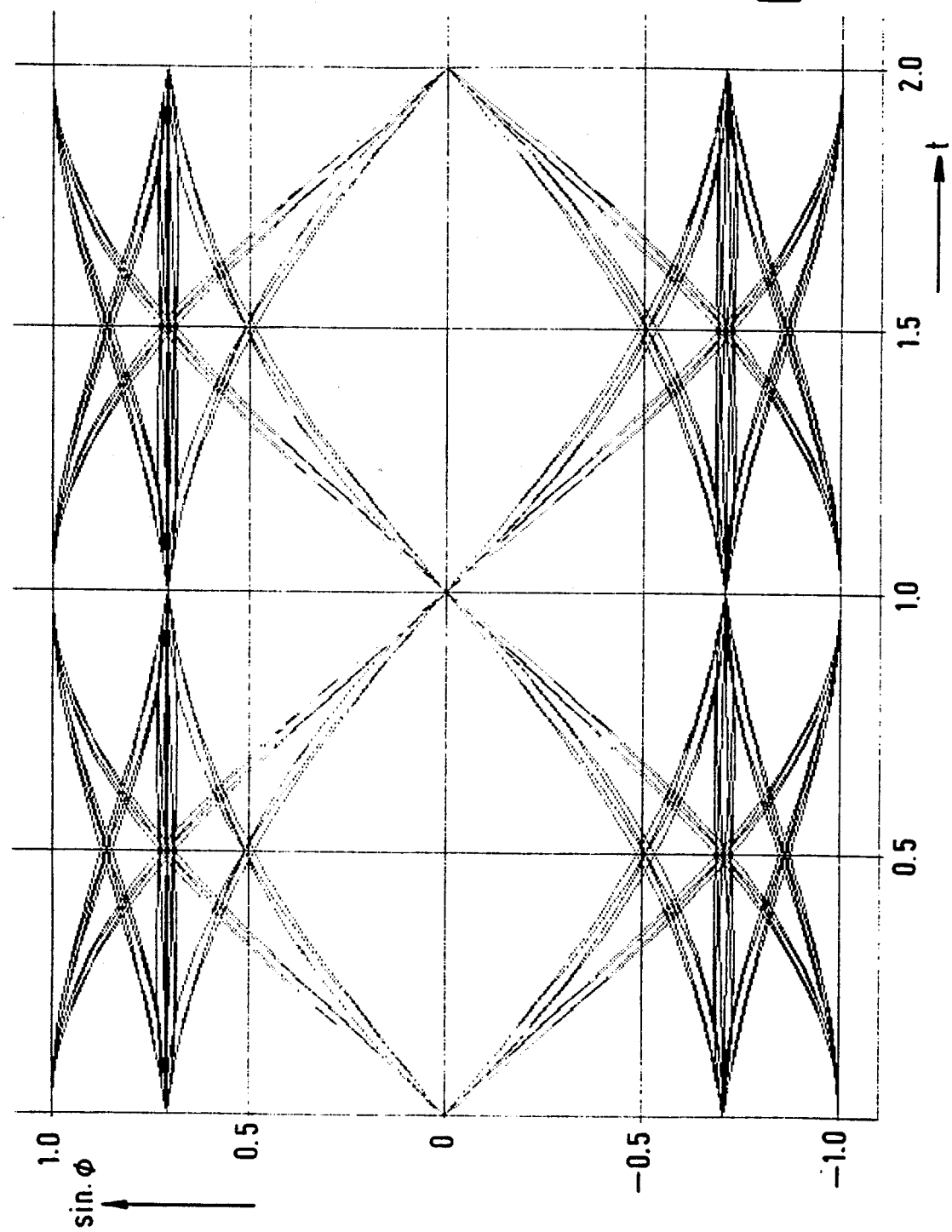

DIGITAL PRE-MODULATION FILTER

BACKGROUND OF THE INVENTION

1. Field of the Invention

The invention relates to a pre-modulation filter with an overall impulse response having the value $k(t)=f(t)\cdot w(t)$, where $f(t)$ represents the impulse response of the filter, and $w(t)$ represents a window function determining a finite width of the overall impulse response.

2. Related Art

A pre-modulation filter of this structure, in which $f(t)$ represents the untruncated impulse response $g(t)$ of the pre-modulation filter, is known from the U.S. Pat. No. 4,229,821.

As described in the above Patent such a pre-modulation filter is used in combination with a modulator of a transmitter for transmitting an angle-modulated carrier signal of a substantially constant amplitude. Such a transmitter is generally intended to transmit binary data signals at a given symbol rate 1/T to a receiver through a transmission channel having a limited bandwidth.

In systems for transmission over radio links the modulation techniques should exhibit the most efficient use of the bandwidth of an available transmission channel. Even if a modulation technique resulting in an angle-modulated carrier signal of a continuous phase is used, the spectrum of this angle-modulated carrier signal will, nevertheless, generally be wider than that of the equivalent baseband signal. Limiting this spectrum by means of a channel filter is an unattractive solution for radio communication systems, since the practical implementation of such a channel filter having accurately prescribed amplitude and phase characteristics and usually a very small relative bandwidth in the radio frequency range, is extremely difficult and requires a high transmission power. In addition, numerous systems are of the multi-channel type, in which the carrier frequency to be transmitted is to be able to assume a relatively large number of different values. Therefore, the spectrum of the angle-modulated carrier signal in radio communication systems is generally restricted by means of pre-modulation techniques.

A further requirement on modulation techniques for radio communication systems is the fact that the corresponding detection techniques should result in an error chance as a function of the signal-to-noise ratio, which degrades as little as possible with respect to the error chance for optimum baseband transmission of the relevant data signals.

As further explained in the above Patent, such a pre-modulation filter can be considered to be a cascade arrangement of an encoding circuit and a low-pass filter. Such an encoding circuit has a partial response. Such a response can simply be described as a polynomial with the aid of the (algebraic) delay operator D for a delay over a symbol interval T, where $D^k$ represents a delay over k-symbol periods and $I=D^0$ is an identity operator. For further details about such polynomials reference is made to an article by P. Kabal et al, entitled "Partial-Response Signalling", published in IEEE trans. Commun., Vol. COM-23, No. 9, pp. 921-924, September 1975.

As appears from the above U.S. Patent it holds for several of such polynomials that the phase $\phi(t)$ of the angle-modulated signal that develops at the output of a modulator which is combined with such a pre-modulation filter, exhibits a smooth and gradual variation as a function of time. This implies that the efficiency of the available frequency spectrum is improved because the power outside the frequency band of the spectral main lobe is decreased considerably. For all the cases considered in the above-mentioned U.S. Patent it was assumed that the low-pass filter fulfils the Nyquist criterion I or III, depending on whether the modulator for which this filter is intended is a phase modulator or a frequency modulator. The Patent also states that it is practically advantageous to realise a pre-modulation filter as a digital transversal filter. In this respect it is observed that despite the finite duration of the impulse response of a digital transversal filter, its transfer function is a good approximation of the transfer function that is desired. The effect of such a restriction of the duration of the impulse response on the power density spectrum of a modulator output signal is illustrated graphically. The variation in the provided graphs implies that a rectangular window function is utilized.

However, in the above-mentioned U.S. Patent, there is no further discussion of the attendant consequences of the use of truncation of the impulse response of such a filter with respect to the variation of the phase $\phi(t)$ of the angle-modulated signal that is generated at the output of the modulator. The effect of the power density spectrum is also compared exclusively on the basis of the width to which the impulse response is restricted.

In an article by F. de Jager et al., entitled "Tamed Frequency Modulation, A Novel Method to Achieve Spectrum Economy in Digital Transmission", published in IEEE Trans. Commun., Vol. COM-26, No. 5, pp. 534-542, May 1978, attention is paid to a modulation technique of the type commonly referred to as TFM. Such a modulation technique can be characterized by a specific partial-response polynomial F(D) having the value $F(D)=(1+D)^2$. This article describes the implementation of such an encoding technique in combination with different truncation lengths 3T, 5T and 7T as they are provided by a low-pass filter in which a transfer function of the type commonly referred to as Racos (raised cosine) is incorporated. In this article the effect of the different truncation lengths on the spectral power density is considered.

A generalization of the modulation techniques described in the above literature is presented in an article by D. Muilwijk, entitled "Correlative Phase Shift Keying-A Class of Constant Envelope Modulation Techniques", published in IEEE Trans. Commun., Vol. COM-29, No. 3, pp. 226-236, March 1981. In this article various modulation techniques of the type commonly referred to as CORPSK are described and analysed. However, there is no further discussion of the effect which truncation of the impulse response has on the angle-modulated signal with substantially constant amplitude developed at the output of an associated modulator.

SUMMARY OF THE INVENTION

It is an object of the invention to improve a premodulation filter of the type described in the field of the invention. A combination of such a premodulation filter with a digital modulator for generating an angle-modulated carrier signal with a substantially constant amplitude leads to a narrow-band spectrum of the main lobe accompanied with minimum energy contents outside the useful band, while fulfilling the requirement that the phase $\phi(t)$ of this angle-modulated signal at the instants marking the bit intervals passes through substantially fixed values.

A digital pre-modulation filter with an overall impulse response having the value $k(t)=f(t)\cdot w(t)$, where $f(t)$ represents the impulse response of the filter, and $w(t)$ represents a window function defining a finite width of the overall impulse response, characterized in that the overall impulse response $k(t)=A\cdot\{g(t)+x(t)\}\cdot w(t)$, where A is a correction factor still to be determined, $g(t)$ is the untruncated impulse response of the filter, $x(t)$ represents a continuous correction function operating over p symbol intervals, $k(t)$ is a continuous function, $$\int_{(r-1/2)T}^{(r+1/2)T} k(t)dt = \int_{(r-1/2)T}^{(r+1/2)T} A\cdot g(t)dt,$$

where $r$ is an arbitrary integer $w(t)=1$, for $|t|<(i+\frac{1}{2})T$, where i can be 0, 1, 2, ...,
$w(t)$ is continuous for $(i+\frac{1}{2})T \leq |t| \leq (i+j)T$
$w(t)=0$ for $|t|>(i+j)T$, where $j=(2p+1)/2$; $p=1, 2, 3, \ldots$, and
T is the symbol interval.

A premodulation filter that is specifically suitable for use in combination with a digital TFM modulator of the type described in the above-mentioned article by de Jager, is characterized, according to the invention, in that $A=1$ and the correction function $x(t)$ is time dependent and per symbol interval 1 is equal to $$x(t) = \begin{cases} -c_l\left[\sin\left(\frac{\pi}{T}(|t|-(i+l-1/2)T)\right)\right]^n, & \text{for } (i+l-1/2)T < |t| < (i+l+1/2)T \\ 0 & \text{elsewhere} \end{cases}$$

wherein $c_l$ represents a constant per bit interval 1 and n represents a positive integer, where for the constant $c_l$ it holds that $$c_l = \frac{-\int_{(i+l-1/2)T}^{(i+l+1/2)T} g(t)\cdot[1-w(t)]dt}{\int_{(i+l-1/2)T}^{(i+l+1/2)T} \sin^n\left(\frac{\pi}{T}[|t|-(i+l-1/2)T]\right)\cdot w(t)dt}$$

A pre-modulation filter corrected thus with respect to the impulse response and "softly truncated" results in an overall impulse response that gradually falls off to the value zero at the truncation instants as determined by the chosen width of the window function. At the relevant instants marking the symbol intervals, the continuous phase $\phi(t)$ of the output signal of a digital TFM modulator in which such a pre-modulation filter is used also passes through substantially fixed values.

A further embodiment of a pre-modulation filter is characterized, according to the invention, in that the correction function $x(t)$ is a time independent constant $c_0$, while the following holds for this constant:

$$c_c = \frac{A_g A_{rgw} - A_{rg} A_{gw}}{A_w A_{rg} - A_g A_{rw}}; \text{ and the correction factor}$$

-continued $$A = \frac{A_w A_{rg} - A_g A_{rw}}{A_w A_{rgw} - A_{gw} A_{rw}}$$

where $$A_{rgw} = \int_{(i+1/2)T}^{(i+j)T} g(t)w(t)dt$$

$$A_{rw} = \int_{(i+1/2)T}^{(i+j)T} w(t)dt$$

$$A_{rg} = \int_{(i+1/2)T}^{(i+j)T} g(t)dt$$

$$A_{gw} = \int_{-(i+j)T}^{(i+j)T} g(t)w(t)dt$$

$$A_w = \int_{-(i+j)T}^{(i+j)T} w(t)dt$$

$$A_g = \int_{-(i+j)T}^{(i+j)T} g(t)dt$$

With the premodulation filter impulse response corrected thus and softly truncated, the impulse response at the instants $t=\pm T/2$ does not pass exactly through the original value. Consequently, the phase $\phi(t)$ of the angle-modulated signal that is generated at the output of the modulator, is only approximately to pass through fixed points (of the "eye pattern").

BRIEF DESCRIPTION OF THE DRAWING

The invention will now be further discussed with reference to the drawing in which:

FIGS. 7a to 7d are used to illustrate the correction realised in a pre-modulation filter according to the invention, achieving, in addition to the improvement realised in FIG. 6, that the phase of the output signal of a modulator in which this filter is used, continues to pass through substantially fixed values.

DETAILED DESCRIPTION OF THE PREFERRED EMBODIMENTS

The invention will be explained hereinafter with reference to a digital pre-modulation filter which is specifically intended for a digital TFM modulator.

In the above U.S. Patent it is described that a suitable pre-modulation filter has a transfer function $G(\omega)$ of the value $$G(\omega) = S(\omega) \cdot H(\omega) \quad (1)$$

where the transfer functions $S(\omega)$ and $H(\omega)$, respectively, are associated to the encoding circuit and low-pass filters, respectively, comprised in such a filter and which functions are given by $$S(\omega) = \cos^2(\omega T/2) \quad (2)$$

and $$H(\omega) = \left[\frac{\omega T/2}{\sin(\omega T/2)}\right]^2, \text{ for } \omega \leq \pi/T \quad (3)$$
$$0, \text{ for } \omega > \pi/T$$

respectively, where T represents the symbol interval of a digital signal received by the pre-modulation filter and which has to form the modulate for the TFM modulator. In this respect the above Patent points out that for the case under consideration the encoding circuit can be characterized by the partial response polynomial F(D), which satisfies the relation $$F(D) = D^0 + 2D + D^2 \quad (4)$$

As described in the above article by Muilwijk, other partial response polynomials F(D) of the order of k, where $k = 0, 1, 2, 3, \ldots$, and $D^k$ represents a delay over k symbol intervals, can be used for the modulation techniques referred to as CORPSK for characterising the encoding circuit of an associated pre-modulation filter.

Figure 1:
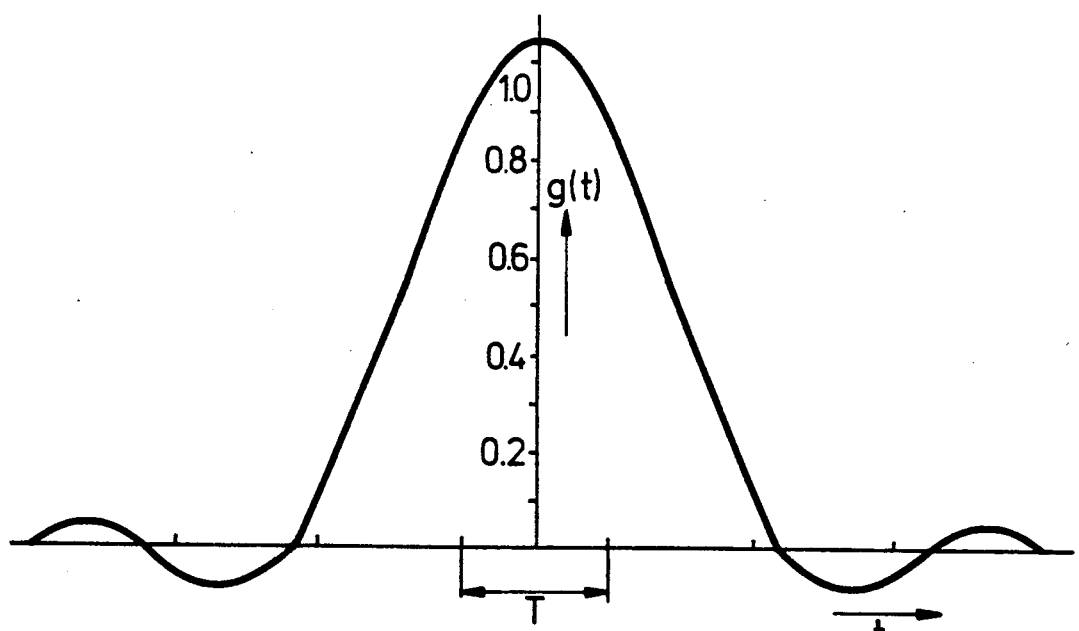
FIG. 1 shows a time diagram to illustrate the untruncated impulse response $g(t)$ of a pre-modulation filter.

FIG. 1 illustrates the impulse response g(t) belonging to the transfer function $G(\omega)$ specified by the formulas (1), (2) and (3). According to this Figure the most conducive values of such an impulse response are located in a central interval having a width of 3 T, while values outside a central interval having a width of 7T differ only slightly from the value zero.

Figure 2:
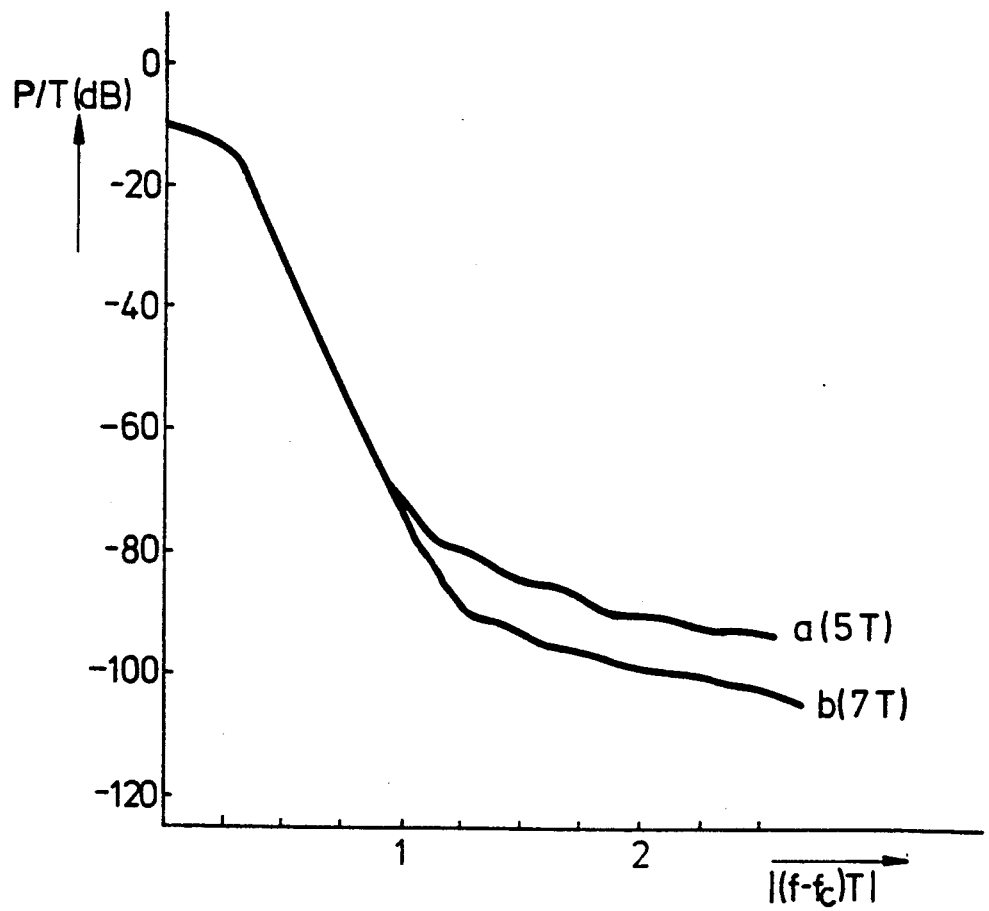
FIG. 2 shows several graphs to illustrate the normalised spectral power density P/T plotted against the normalised frequency (applied to TFM)

In the above-mentioned U.S. Patent it is further stated that if such an impulse response is restricted or truncated, to a central interval having a width of 5T or 7T respectively, the normalised spectral power density P/T as a function of the normalised frequency $|f - f_c|T$, where f or $f_c$ respectively, represents the frequency of the angle-modulated modulator output signal or the carrier frequency of the modulator output signal, presents a variation as shown in FIG. 2. In this Figure the curve a or b respectively, represents the output signal of a TFM modulator in which the pre-modulation filter used therein has an impulse response which is truncated to a width 5T or 7T, respectively. Such a truncation can be realised by incorporating in the impulse response of the above low-pass filter a window function w(t). The transfer function $H(\omega)$ of such a low-pass filter can be written as $$H(\omega) = \left[\frac{\omega T/2}{\sin(\omega T/2)}\right]^2 \cdot N'(\omega) \quad (5)$$

of which $N'(\omega)$ will presently be further explained.

The variation shown in FIG. 2 applies to the case in which truncation is effected while a "rectangular" window function w(t) is utilized. As can further be observed from this curve a or b respectively, such a "hard" truncation causes a relatively flat widening of the power density spectrum P/T of the angle-modulated carrier signal which is generated at the output of the modulator.

In the above U.S. Patent there are summarising reflections on a class of characteristics selected for the transfer function $N'(\omega)$ of the type known as Racos (raised cosine). As is known, such a Racos characteristic consists of a portion having a constant amplitude and a portion having a sinusoidally decreasing amplitude, and which characteristic can be specified by a parameter $\alpha$ indicating to what extent the bandwidth exceeds the minimum Nyquist bandwidth of $\pi/T$. In the case when $\alpha = 0$, the above-mentioned low-pass filter has the narrowest bandwidth possible. The fact that $N'(\omega)$ for a Racos characteristic can be written as $$N'(\omega) = \begin{cases} 1, & \text{for } 0 \leq \omega < (1-\alpha)\pi/T \\ 0.5[1 - \sin\{\phi T - \pi)/2\alpha\}], & \text{for } (1-\alpha)\pi/T \leq \omega \leq (1+\alpha)\pi/T \\ 0, & \text{for } \omega > (1+\alpha)/T \end{cases} \quad (6)$$

is widely known (the book entitled "Principles of Data Communication" by R. W. Luckey et al., New York, MacGrawHill, 1968).

The effect of the bandwidth of the low-pass filter, having a transfer function according to the above-mentioned formula (5), on the power density spectrum of the angle-modulated signal, that occurs at the output of the modulator comprising the pre-modulation filter under consideration, can be verified by varying the parameter $\alpha$ of the transfer function $N'(\omega)$. In this connection according to the above U.S. Patent it is concluded that when the central interval of the impulse response is restricted to a width of 5T according to a rectangular window and the parameter $\alpha$ is varied, the spectral power density of the modulator output signal will not appreciably differ from the one at which for $\alpha$ the value is chosen to be zero, if $\alpha < 0.25$. In the considerations in the above U.S. Patent it is always assumed that for the relevant low-pass filter the parameter $\alpha$ is zero.

Figure 3:
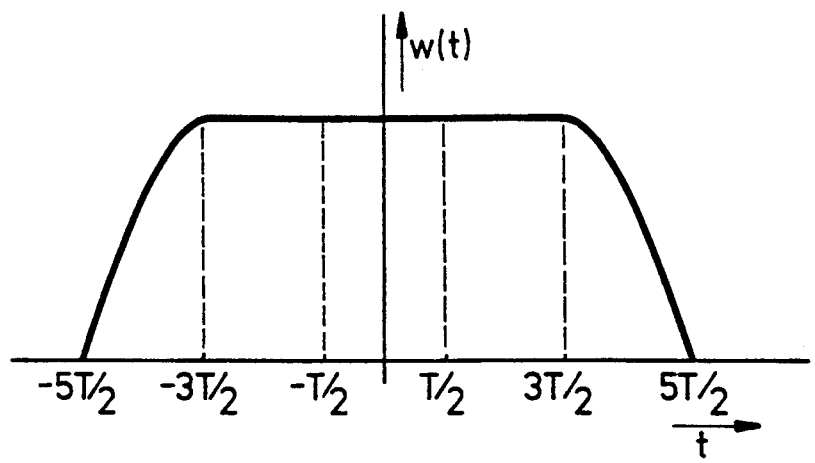
FIG. 3 shows a time diagram to illustrate a possible window function with which a softly truncated impulse response of the pre-modulation filter is achieved.

In the scope of the present invention, however, a window function having the value $$w(t) = \begin{cases} 1, & \text{for } |t| < 3T/2 \\ \cos[\pi/2(|t|/T - 3/2)], & \text{for } 3T/2 \leq |t| \leq 5T/2 \\ 0, & \text{for } |t| > 5T/2 \end{cases} \quad (7)$$

is utilized instead of a rectangular window function, in order to obviate the disadvantage which was mentioned with respect to FIG. 2, so that a "soft" truncation is obtained. Such a function is represented in FIG. 3.

In this connection the following observations should be made. Generally speaking, a window function $w(t)$ applied in the scope of the invention shows a continuous variation over a time interval comprising one or more intervals T, so that the following holds: $(i+\frac{1}{2})T \leq |t| \leq (i+j)T$, with $i=0, 1, 2, 3, \ldots$; $j=(2p+1)/2$; and $p=1, 2, 3, \ldots$ For simplicity it is assumed in the considerations hereinafter that $i=1$ and $p=1$ so that the intended time interval is defined between $3T/2$ and $5T/2$, and the overall window width is $5T$.

Figure 4:
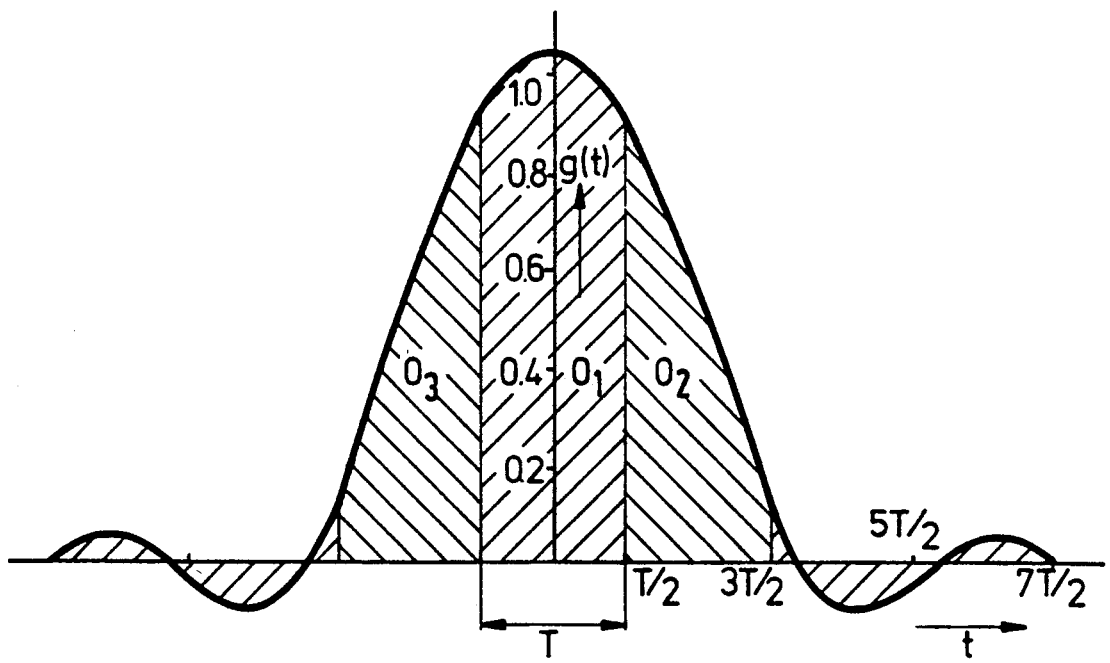
FIG. 4 shows a time diagram similar to that of FIG. 1 and by means of which the requirements that a pre-modulation filter has to fulfill will be explained.

The impulse response function of a pre-modulation filter is generally considered to be such that the phase function $\phi(t)$ of the angle-modulated signal that is developed at the output of the modulator, always passes through fixed phase values, such as for example 0, $\pm\pi/4$, $\pm\pi/2$ rad. at the instants $t=mT$, where m represents an integer marking the bit intervals. Such a condition implies, in other words, that the transfer function $H(\omega)$ of the pre-modulation filter is to satisfy the Nyquist-III or I criterion, respectively (in case the relevant modulator is a frequency modulator or phase modulator, respectively). For the case under discussion in which the encoding circuit is characterised by the partial response polynomial F(D) having the value $F(D)=D^0+2D+D^2$(TFM), it holds in relation to the Nyquist III criterion for the impulse response function g(t) according to FIG. 4, assuming that the central area $0_1$ bounded between the positions $+T/2$ and $-T/2$ is normalised to the value 1, that a) the sub-areas $0_2$ and $0_3$ situated between the positions $+3T/2$ and $+T/2$ or $-3T/2$ and $-T/2$ respectively, are each equal to 0.5; and b) all sub-areas outside the values $\pm 3T/2$ in the symbol periods marked by the symbol intervals are to be equal to zero.

Departing from these conditions, the invention is based on the following considerations:

when a "hard" truncation is used, which narrows down to the use of a rectangular window function $w(t)$ having a window width that is 5 T in the case under consideration, at the positions $+5 T/2$ and $-5 T/2$ the thus truncated impulse response of a pre-modulation filter will abruptly and discontinuously fall off to the value zero. This is further illustrated in FIG. 5, curve 1; in FIG. 5 the curve 1, 2, 3 respectively, shows on an enlarged scale a portion of a hard or softly truncated impulse response, respectively. As a result of such a hard truncation the power density spectrum is adversely affected. This objection can be met by truncating the impulse response using a window function $w(t)$ of the type described hereinbefore with regard to formula (7).

The softly truncated impulse response (curve 3) of a pre-modulation filter is to be modified such that (here in the case of TFM) over the whole truncation range the above conditions a) and b) are continued to be satisfied (curve 2). The defining positions are then $+3/2T$ and $5/2T$ and $-3/2T$ and $-5/2T$, respectively.

On the basis of these considerations it is proposed according to the invention to realise such a modification by adding to the untruncated impulse response $g(t)$ of the pre-modulation filter with which impulse response a transfer characteristic $G(\omega)$ according to the formulas (1), (2) and (5) corresponds, a time-dependent or time-independent correction function $x(t)$, which has a value different from zero only between the defining positions $|(i+\frac{1}{2})T|$ and $|(i+j)T|$, or the positions $+3T/2$ and $+5T/2$, $-3T/2$ and $-5T/2$ respectively, for the above-mentioned case, and to add a correction factor A. The overall, softly truncated and corrected impulse response function $k(t)$ of a pre-modulation filter according to the invention can thus be written $$k(t) = A\{g(t) + x(t)\} \cdot w(t) \quad (8)$$

where A is the correction factor, and with $$x(t) = \begin{cases} \neq 0, & \text{for } 3T/2 < |t| < 5T/2 \\ 0, & \text{elsewhere.} \end{cases} \quad (9)$$

In a preferred embodiment the function $x(t)$ to be written as $$x(t) = \begin{cases} -c[\sin\{\pi/T(|t| - 3T/2)\}]^n, & \text{for } 3T/2 < |t| < 5T/2 \\ 0, & \text{elsewhere} \end{cases} \quad (10)$$

specifically appears to be suitable for a time-dependent correction function $x(t)$. As appears from the above expression a correction is made with a sine function of a half interval over one symbol interval. However, in this situation it is equally possible to correct with a sine function of a quarter of an interval. In formula (10) n is a positive integer and c a constant. Assuming that the width of the window function $w(t)$ is defined up to the interval 5T, this constant c can be computed by means of the relationship:

$$\int_{3T/2}^{5T/2} \{g(t) + x(t)\} \cdot w(t) dt = 0 \quad (11)$$

From this it can be derived for the constant c that $$c = -\frac{\int_{3T/2}^{5T/2} g(t) w(t) dt}{\int_{3T/2}^{5T/2} \sin^n\left(\frac{\pi}{T}(|t| - 3/2T)\right) \cdot w(t) dt} \quad (12)$$

Figure 5:
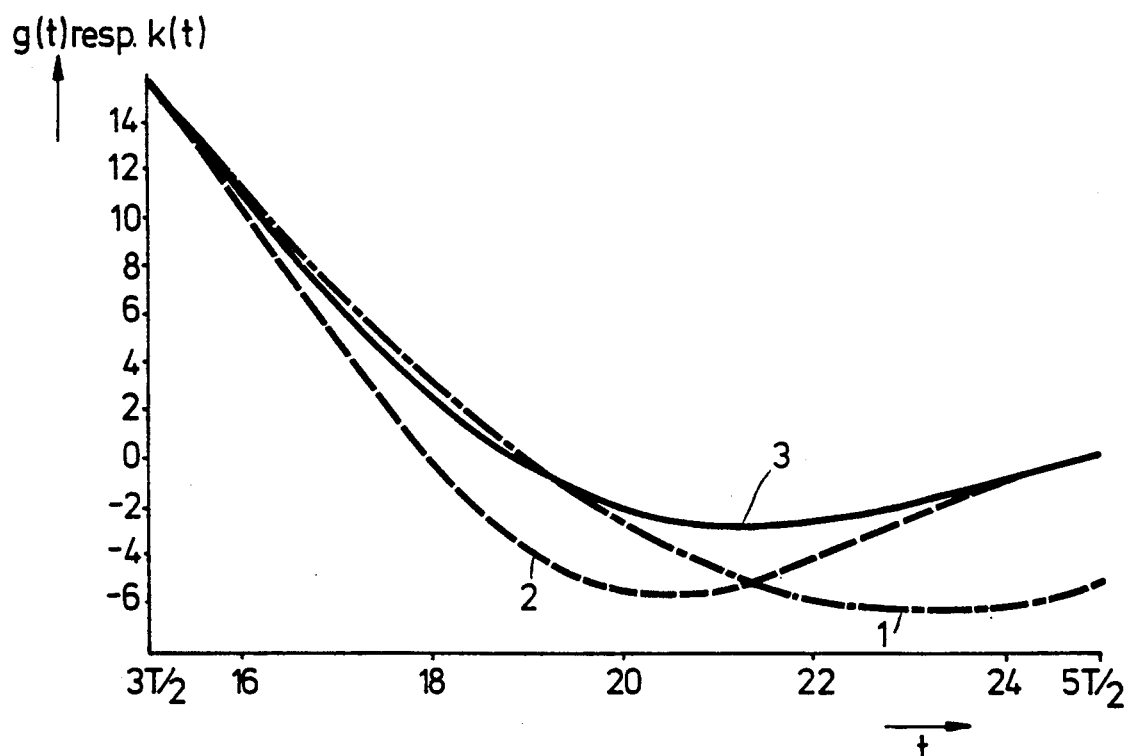
FIG. 5 shows on an enlarged scale a "marginal portion" of a time diagram similar to that of FIG. 4, to illustrate the difference between an impulse response truncated according to the state of the art and a softly truncated and corrected impulse response according to the invention.

With such a correction function $x(t)$ the phase function $\phi(t)$ of the angle-modulated output signal of the modulator in which a pre-modulation filter according to the invention is implemented passes through substantially fixed phase values at the instants mT with $m=0$; $\pm 1$; $\pm 2$; $\pm 3$; . . . . In addition, the impulse response at the positions $\pm 5T/2$ gradually falls off to the value zero in a way similar to the one shown in FIG. 5, diagrammatically shown by the curves 2 and 3. This promotes a more gradual variation of the phase function $\phi(t)$ due to which the spectrum efficiency is improved.

Figure 8:
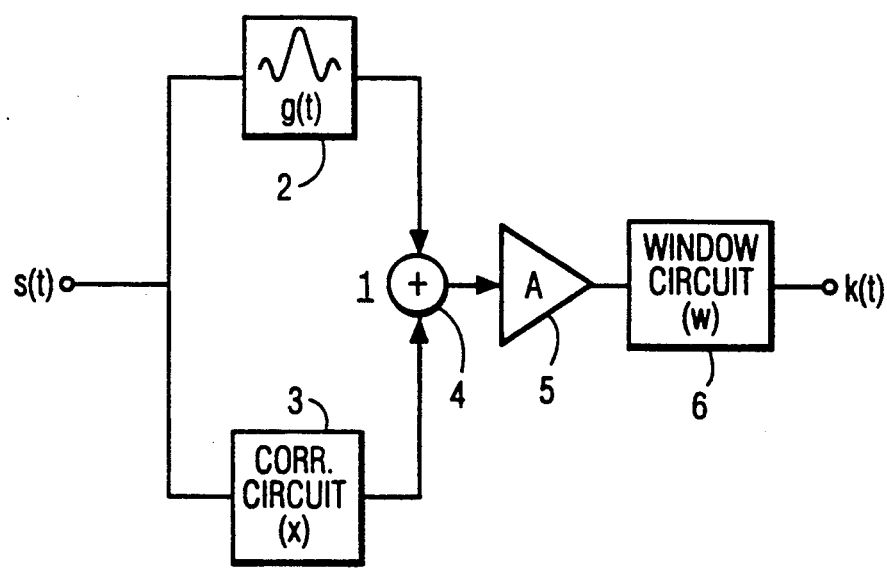
FIG. 8 shows a schematic diagram of the filter according to the invention.

FIG. 8 schematically shows a filter (1) according to the invention. An input data signal $s(t)$ to be filtered in the filter (1) is applied to a filter section 2 which as an output signal in response to the signal s(t) provides a signal g(t) corresponding to the untruncated impulse response of the filter. The signal s(t) is also applied to the input of a filter section 3 which, in response to s(t), as an output signal provides the signal x(t). The signals g(t) and X(t) are added in a summing circuit 4, the output of which is applied to the input of an amplifier section 5, which amplifies the signal x(t)+g(t) with a factor A. Finally the output signal A {g(t)+x(t)} is applied to the input of a filter section 6, which applies a window function to its input signal to provide the required output signal k(t)=A·{g(t)+x(t)}·w(t) according to the invention. For an explanation of the way in which the premodulation filter according to the present invention can be incorporated in a transmission system for binary data a reference is made to U.S. Pat. No. 4,229,821 (de Jager et al.) mentioned above.

The invention is not restricted to the embodiment described hereinbefore by way of illustration. In a wider scope the invention can be applied to pre-modulation filters which are implemented as transversal filters, as well as intended for modulation techniques belonging to the type denoted CORPSK which is described in the above article by D. Muilwijk.

Assuming that generally the values $|(i+\frac{1}{2})T|$ and $|(i+j)T|$ are selected for the defining positions, for such a premodulation filter, it holds that:

$$\int_{(r-1/2)T}^{(r+1/2)T} k(t)dt = \int_{(r-1/2)T}^{(r+1/2)T} g(t)dt$$

where r is an integer such that the integration intervals are situated in the range $(i+\frac{1}{2})T$ to $(i+j)T$; k(t) is to be a continuous function and where i=0, 1, 2, 3, . . . ; j=(2p+1)/2; p=1, 2, . . . ; T is the symbol interval of a binary data signal that is presented to the relevant pre-modulation filter; g(t) is the impulse response of the "original" pre-modulation filter; and k(t) =A{g(t)+x(t)}·w(t), with A=1 represents the modified or, according to the invention, truncated and corrected impulse response. Worded differently, the extent of the variation which the phase $\phi(t)$ of the angle-modulated carrier signal, which is generated in response to the binary data signal at symbol rate 1/T at the output of a modulator in which the modified pre-modulation filter having the impulse response k(t) is implemented, is subjected to, over an interval between $(i+\frac{1}{2})T$ and $(i+3/2)T$, is to be equal to the extent of the variation which the phase $\phi(t)$ is subjected to over this same interval, if in the modulator the "original" pre-modulation filter having impulse response g(t) is implemented. The functions w(t) and x(t) are further to show a continuous variation, the variation of the correction function x(t) being determined by the condition that:

$$\int_{(i+1/2)T}^{(i+3/2)T} k(t)dt = 0 \text{ for } \int_{(1+1/2)T}^{(i+3/2)T} g(t)dt = 0$$

This entails that the window function w(t) shows a continuous variation over an interval between $-(i+\frac{1}{2})T$ and $-(i+3/2)T$ and between $(i+\frac{1}{2})T$ and $(i+3/2)T$, and $$\int_{-(i+1/2)T}^{(i+1/2)T} k(t)dt = \int_{-(i+1/2)T}^{(i+1/2)T} g(t)dt$$

Based on the above conditions a correction function x(t) and a window function w(t) can be determined for the impulse response of a pre-modulation filter according to the invention.

According to another embodiment the object aimed at can be achieved if a time-independent, thus constant correction function $x(t)=c_c$ is added to the untruncated impulse response g(t) of the pre-modulation filter, to which impulse response a transfer function $G(\omega)$ according to the formulas (1), (2) and (5) corresponds so that the overall impulse response is equal to $k(t)=A\{g(t)+c_c\}\cdot w(t)$, where a correction of the area by a factor A is made according to the ratio $A=A_1/A_2$ on a softly truncated impulse response of the pre-modulation filter corrected thus and having the window function w(t) according to formula (7), where, assuming that j=3/2 is chosen for the defined limit values $(i+\frac{1}{2})T$ and $(i+j)T$ with regard to formula (7), $A_1$ is a measure for the range of the untruncated impulse response g(t) of the pre-modulation filter between the defining values $+(i+3/2)T$ and $-(i+3/2)T$, and $A_2$ is a measure for the range of the softly truncated and corrected impulse response h(t) of the pre-modulation filter between the defining values $+(i+3/2)T$ and $-(i+3/2)T$. From these values the ratio $A_1/A_2=A$ and the constant $c_c$ can be determined. This is done by implementing the relationships:

$$A \int_{-(i+j)T}^{(i+j)T} \{g(t) + c_c\} \cdot w(t)dt = \int_{-(i+j)T}^{(i+j)T} g(t)dt \tag{13}$$

$$A \int_{(i+1/2)T}^{(i+j)T} \{g(t) + c_c\} \cdot w(t)dt = \int_{(i+1/2)T}^{(i+j)T} g(t)dt \tag{14}$$

with $$A_{rgw} = \int_{(i+1/2)T}^{(i+j)T} g(t) \cdot w(t)dt \tag{15}$$

$$A_{rw} = \int_{(i+1/2)T}^{(i+j)T} w(t)dt \tag{16}$$

$$A_{rg} = \int_{(i+1/2)T}^{(i+j)T} g(t)dt \tag{17}$$

$$A_{gw} = \int_{-(i+j)T}^{(i+j)T} g(t) \cdot w(t)dt \tag{18}$$

$$A_w = \int_{-(i+j)T}^{(i+j)T} w(t)dt \tag{19}$$

$$A_g = \int_{-(i+j)T}^{(i+j)T} g(t)dt \tag{20}$$

for $c_c$ and $A=A_1/A_2$ it can be derived that:

$$c_c = \frac{A_g A_{rgw} - A_{rg} A_{gw}}{A_w A_{rg} - A_g A_{rw}} \tag{21}$$

and

-continued $$A = \frac{A_w A_{rg} - A_g A_{rw}}{A_w A_{rgw} - A_{gw} A_{rw}} \quad (22)$$

With a previously described softly truncated and corrected impulse response of the pre-modulation filter the condition that the phase function $\phi(t)$ of the angle-modulated output signal of the modulator at the instants mT shows a passing through fixed phase value is approximately satisfied.

The features of a pre-modulation filter according to the invention are illustrated in the FIGS. 6 and 7a to 7d which apply to TFM signals.

Figure 6:
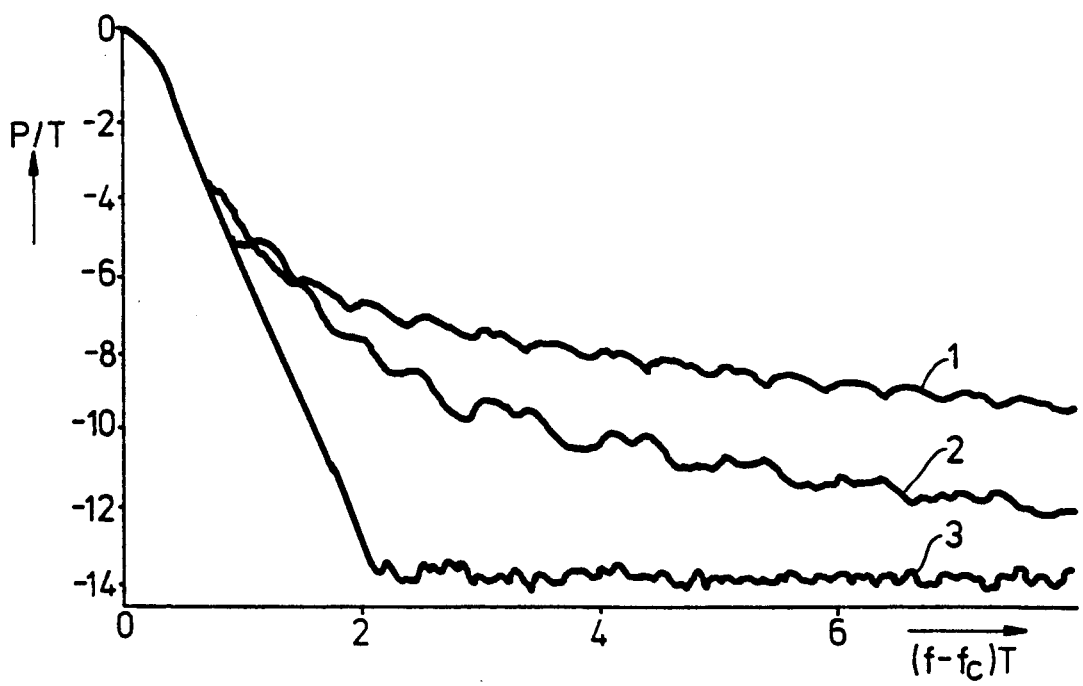
FIG. 6 shows several curves to illustrate the improvement of the power density spectrum realised with a pre-modulation filter 25 according to the invention, more specifically as regards the out-of-band transmission.

The graphs represented in FIGS. 6 and 7 are obtained as far as truncation is concerned by using a pre-modulation filter whose impulse response was truncated to a window width of 5T, while the eye pattern according to FIG. 7d applies to a pre-modulation filter whose impulse response is also corrected with a function having the value $\sin^2(\pi t/T)$.

The power density spectra represented in FIG. 6, in other words the normalised spectral power density P/T versus the normalised frequency $|(f-f_c)T|$, are representative of angle-modulated output signals of a modulator having a pre-modulation filter whose impulse response a) is not truncated, curve 3;
b) is truncated "hard", curve 1; and
c) is truncated "softly", curve 2.

Truncation, generally speaking, means cost saving and simplification as regards the implementation of the modulator and the pre-modulation filter used therein. However, this is off-set by the fact that at any rate "hard truncation" leads to a degradation of the power density spectrum. This is illustrated by the graphs 1 and 3.

This objection is met by the use of "soft truncation". The resulting improvement with respect to the power density spectrum is illustrated by the graphs 1 and 2.

In addition to such an improvement, the requirement is still to be satisfied that the phase $\phi(t)$ of the modulator output signal continues to pass through substantially fixed values at sampling instants marking the bit intervals. The eye pattern showing the variation of the phase angle $\phi$ versus time t indicates to what extent the latter requirement is satisfied.

The eye pattern as shown in FIG. 7a applies to the situation in which the impulse response of the pre-modulation filter used in the modulator is not truncated.

The eye patterns as shown in FIGS. 7b; 7c and 7d apply to the situation in which the impulse response of the pre-modulation filter used in the modulator is:

a) truncated hard;
b) truncated softly; and
c) truncated softly according to the invention and corrected.

Figure 7C:
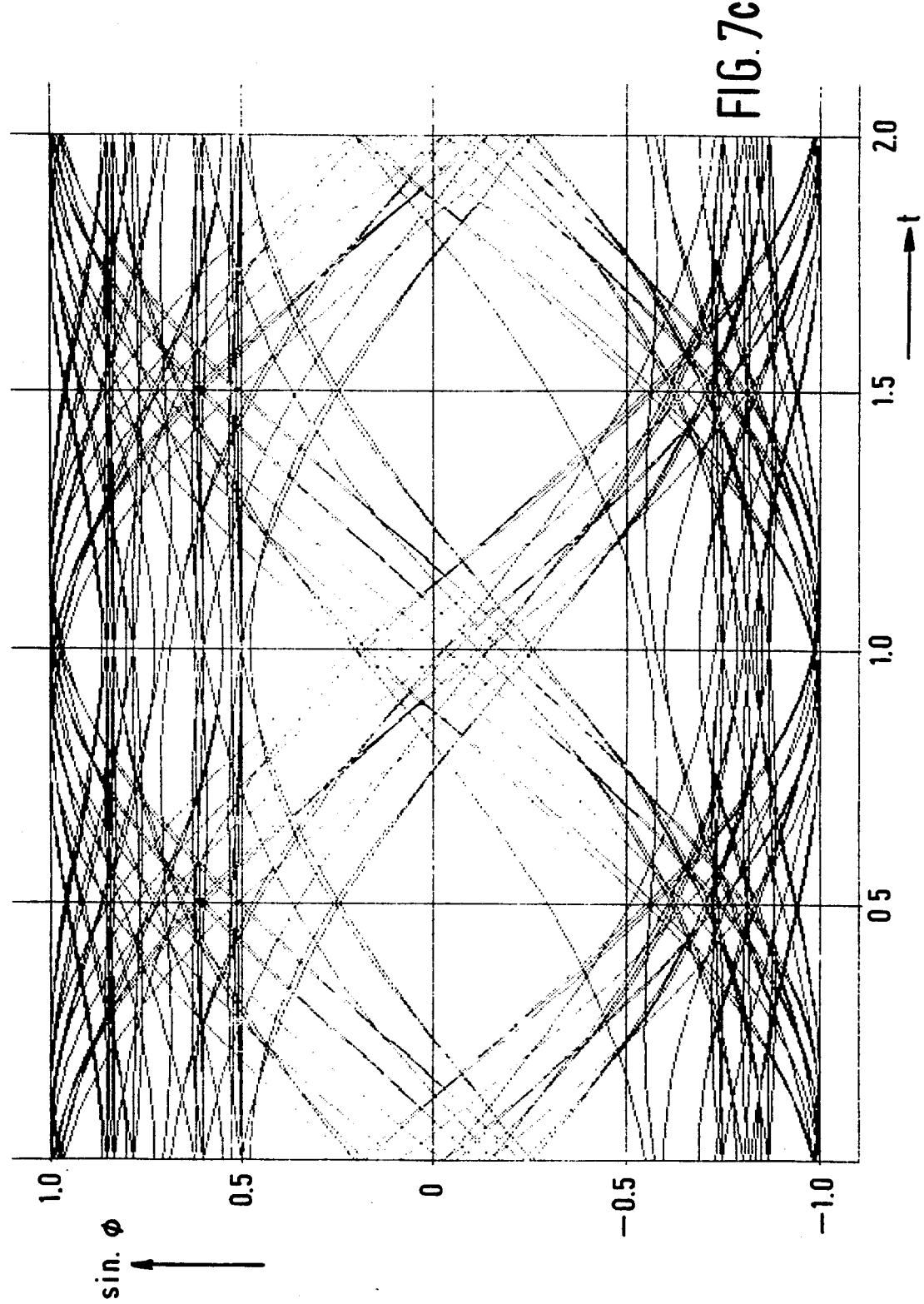

A comparison of the FIGS. 7d, and 7c, in relation to the FIGS. 7b, 7a and 6, curve 2, shows that with a pre-modulation filter according to the invention the two requirements as to the power-density spectrum and phase variation are met in a satisfactory way.

As appears from FIG. 7d, the sin $\phi$ values, detected at the sampling instant whose abscissa value 1.00 is representative, do correspond with the sin $\phi$ values that are detected at the sampling instant for the case in which the impulse response of the pre-modulation filter used is not truncated or truncated hard.

FIG. 7c shows that for the case in which the impulse response of the pre-modulation filter is truncated softly, without a correction being introduced, no such correspondence is achieved.

What is claimed is:

1. A digital pre-modulation filter comprising:
   a) means for receiving an input signal;
   b) filter means for forming an output signal from the input signal in accordance with an overall impulse response k(t), where k(t) is defined as follows:

$$k(t) = A \cdot \{g(t) + x(t)\} \cdot w(t),$$

where
   A is a correction factor,
   g(t) is the untruncated impulse response of the filter,
   x(t) represents a continuous correction function operating over p symbol intervals,
   w(t) represents a window function determining a finite width of the overall impulse response;
   k(t) is a continuous function, $$\int_{(r-1/2)T}^{(r+1/2)T} k(t)dt = \int_{(r-1/2)T}^{(r+1/2)T} A \cdot g(t)dt,$$

where r is an arbitrary integer,
   w(t)=1 for $|t| < (i+\frac{1}{2})T$, where i can be 0, 1, 2, ...;
   w(t) is a continuous function for $(i+\frac{1}{2})T \leq |t| \leq (i+j)T$
   w(t)=0 for $|t| > (i+j)T$, where j=(2p+1)/2;
   p is an integer greater than zero representing a number of symbol intervals; and
   T is the symbol interval; and
   c) output means for supplying the output signal.

2. A digital pre-modulation filter as claimed in claim 1, characterized in that the correction function x(t) is at time independent constant $c_c$, while the following holds for this constant:

$$c_c = \frac{A_g A_{rgw} - A_{rg} A_{gw}}{A_w A_{rg} - A_g A_{rw}} \text{; and the correction factor}$$

$$A = \frac{A_w A_{rg} - A_g A_{rw}}{A_w A_{rgw} - A_{gw} A_{rw}}$$

where $$A_{rgw} = \int_{(i+1/2)T}^{(i+j)T} g(t)w(t)dt$$

$$A_{rw} = \int_{(i+1/2)T}^{(i+j)T} w(t)dt$$

$$A_{rg} = \int_{(i+1/2)T}^{(i+j)T} g(t)dt$$

$$A_{gw} = \int_{-(i+j)T}^{(i+j)T} g(t)w(t)dt$$

$$A_w = \int_{-(i+j)T}^{(i+j)T} w(t)dt$$

-continued
$$A_g = \int_{-(i+j)T}^{(i+j)T} g(t)dt$$

3. A digital pre-modulation filter as claimed in claim 1, wherein $A=1$, and the correction function $x(t)$ is time-dependent and for each interval l, where l represents the time interval $(i+l-\frac{1}{2})T \leq |t| \leq (i+l+\frac{1}{2})T$, and where $x(t)$ is equal to $$x(t) = \begin{cases} -c_l\left(\sin\left(\frac{\pi}{T}(|t| - (i+l-\frac{1}{2})T)\right)\right)^n, & \text{for } (i+l-\frac{1}{2})T \leq |t| \leq (i+l+\frac{1}{2})T \\ 0, & \text{elsewhere} \end{cases}$$

where $c_l$ represents a constant for each interval l and n represents a positive integer, the constant $c_l$ being determined for each interval l according to the following equation $$c_l =$$

-continued
$$-\frac{\int_{(i+l-\frac{1}{2})T}^{(i+l+\frac{1}{2})T} g(t) \cdot (1 - w(t))dt}{\int_{(i+l-\frac{1}{2})T}^{(i+l+\frac{1}{2})T} \sin^n\{(\pi/T)(|t| - (i+l-\frac{1}{2})T)\} \cdot w(t)dt}.$$

4. The filter of claim 1 wherein the filter means comprises
  i) a first filter for filtering the input signal and having an impulse response $g(t)$;
  ii) a second filter arranged in parallel with the first filter and having an impulse response $x(t)$;
  iii) means for adding output signals from the first and second filters;
  iv) means for scaling an output signal from the adding means by a factor of A; and
  v) means for windowing an output signal from the scaling means the windowing means having an impulse response $w(t)$.

* * * * *